United States Patent [19]

Shanley, II et al.

[11] 4,263,610

[45] Apr. 21, 1981

[54] CONTROLLED OUTPUT COMPOSITE KEYING SIGNAL GENERATOR FOR A TELEVISION RECEIVER

[75] Inventors: Robert L. Shanley, II, Indianapolis, Ind.; Leopold A. Harwood, Bridgewater; Erwin J. Wittmann, North Plainfield, both of N.J.

[73] Assignee: RCA Corporation, New York, N.Y.

[21] Appl. No.: 113,371

[22] Filed: Jan. 18, 1980

[51] Int. Cl.³ .............................................. H04N 9/46
[52] U.S. Cl. .................................................... 358/20
[58] Field of Search ......................... 358/17, 20, 21, 19

[56] References Cited

U.S. PATENT DOCUMENTS

| | | | |
|---|---|---|---|
| 4,051,518 | 9/1977 | Sendelweck | 358/20 |
| 4,149,179 | 4/1979 | Wilcox | 358/20 |
| 4,149,180 | 4/1979 | Lovely | 358/20 |
| 4,173,023 | 10/1979 | Lagoni et al. | 358/20 |

Primary Examiner—Robert L. Richardson
Attorney, Agent, or Firm—Eugene M. Whitacre; William H. Meagher; Ronald H. Kurdyla

[57] ABSTRACT

A circuit for generating a composite keying signal comprises a burst gate circuit and a voltage translating network in a color television receiver also including keyed signal processing circuits and means for deriving horizontal and vertical blanking signals and a horizontal sync signal from a composite color television signal containing a color burst component. The burst gate circuit responds to the horizontal sync signal to develop a burst gate pulse encompassing the burst interval. A voltage level developed by the translating network in response to the horizontal and vertical blanking signals is combined with the burst gate pulse to produce a composite keying signal. The composite keying signal comprises a first pulse component of a desired level as determined by the translating network and occurring during the blanking intervals, and a second pulse cmponent as provided from the burst gate circuit, superimposed on the first pulse and encompassing the burst interval. Means are also included for inhibiting the output of the keying signal generator during picture intervals of the television signal, to prevent false keying of the keyed circuits in response to keying signals generated by the keying signal generator in the presence of spurious input signals occurring during picture intervals.

10 Claims, 10 Drawing Figures

CONTROLLED OUTPUT COMPOSITE KEYING SIGNAL GENERATOR FOR A TELEVISION RECEIVER

This invention concerns a circuit arrangement for developing a single, composite signal from which multiple keying signals can be derived, for use in a television receiver or equivalent video signal processing system including keyed circuits. In particular, the invention concerns such a circuit wherein the output is controllably suppressed during picture intervals of the video signal.

In a color television receiver for processing a composite color television signal including luminance, chrominance and synchronizing signal components, there is a need for signal processing functions that require keying or synchronization with respect to the composite television signal. In pertinent part, these functions include keying to separate the burst and chrominance information components of the composite signal, keying a blanking level clamp during image blanking intervals to establish a black reference level for a displayed picture, and keying during horizontal and vertical retrace blanking intervals to inhibit image display during these intervals.

When keyed luminance or chrominance signal processing circuits of the receiver are contained within an integrated circuit in whole or in significant part, it is desirable to provide a single, composite keying signal from which signals for performing the described keying functions can be derived. A single, composite keying signal of this type is desirable since only a single external keying signal input terminal of the integrated circuit is then required. Also, an integrated circuit incorporating a composite keying signal generator requires only one output terminal for providing the composite keying signal.

Such a composite keying signal is known, and is often referred to as a "sandcastle" signal because of its configuration. The sandcastle keying signal typically comprises a first pulse component of a given width, and a second pulse component of lesser width superimposed on the first pulse component. The first and second pulse components exhibit given amplitudes and timing in accordance with the keying and synchronizing requirements of signal processing circuits within the receiver.

In accordance with the principles of the present invention, it is herein recognized as being desirable to prevent improper keying of the keyed receiver circuits in response to a composite keying signal of the type described above. Such improper keying can occur if the composite keying signal generator is caused to produce an output composite keying signal during picture intervals rather than synchronizing intervals of the video signal. This may occur, for example, in response to spurious signals such as noise occurring during the picture interval.

An arrangement according to the present invention is included in a color television receiver for processing a composite color television signal containing image information occurring during periodic image intervals and synchronizing information occurring during periodic image blanking intervals. The synchronizing information includes a vertical synchronizing component occurring during vertical blanking intervals, a horizontal synchronizing component occurring during horizontal blanking intervals, and a color burst component occurring during a burst interval within horizontal blanking intervals. The receiver includes a network for providing a horizontal reference pulse representative of the horizontal synchronizing component, a network for deriving horizontal and vertical blanking signals from the synchronizing information, keyed signal processing circuits, and apparatus including means for generating at an output a composite keying signal comprising a first pulse substantially coincident with the blanking intervals and a second pulse superimposed on the first pulse and encompassing the burst interval. The apparatus comprises a signal translating network responsive to the horizontal and vertical blanking signals for producing the first pulse, and a keyed network responsive to the horizontal reference pulse for producing a pulse encompassing the burst interval and corresponding to the second pulse. The first and second pulses are combined to produce the composite keying signal at the output of the composite keying signal generator. The composite keying signal is then coupled to the keyed signal processing circuits. The apparatus also includes a control network coupled to the composite keying signal generator. The control network exhibits one conductive condition during blanking intervals of the television signal, and exhibits another conductive condition during image intervals for inhibiting the output of the composite keying signal generator during image intervals.

Figure 1:
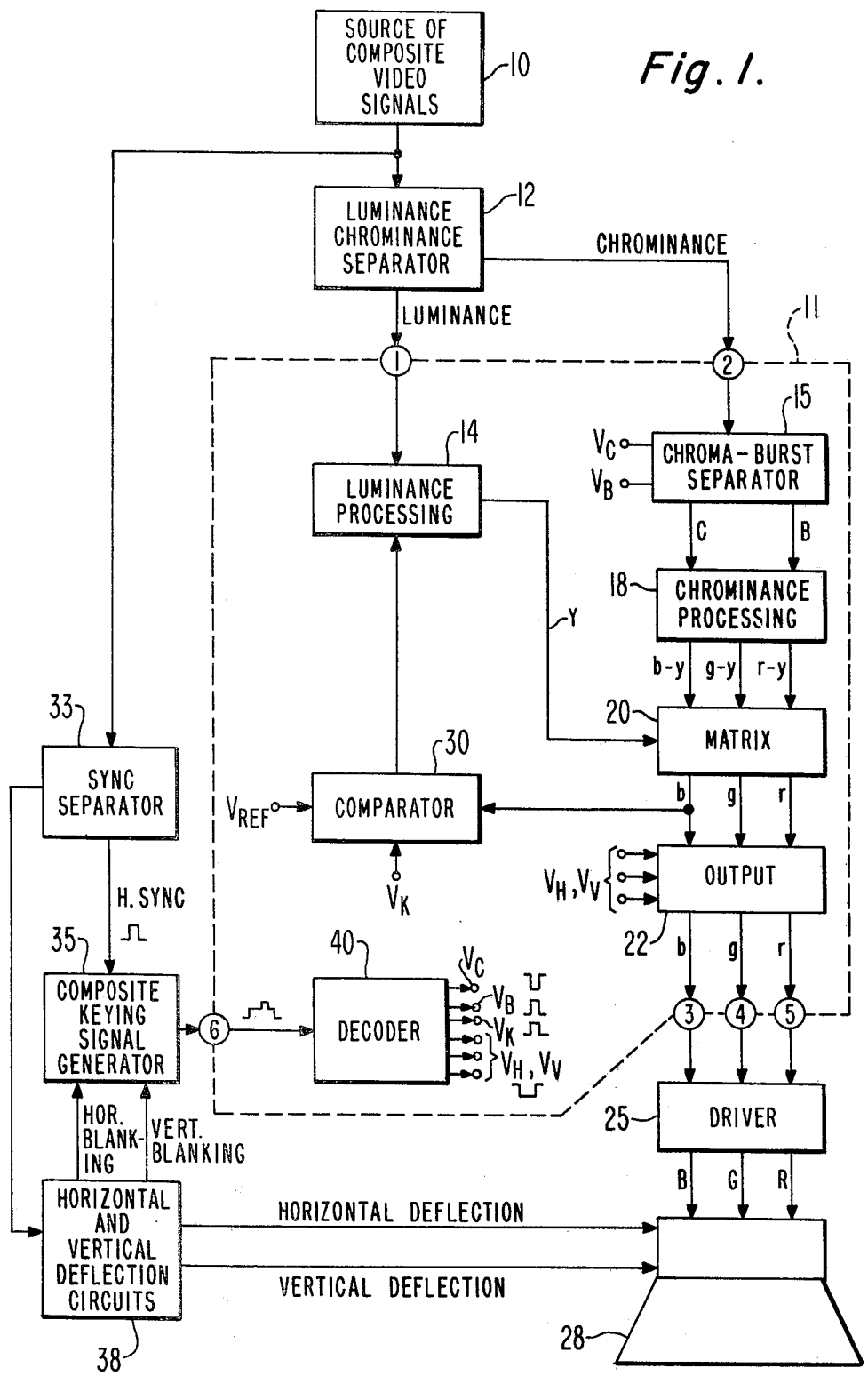
FIG. 1 is a block diagram of a portion of a color television receiver, including a composite keying signal generator according to the present invention.

In FIG. 1, a source of composite color video signals 10 (e.g., including RF and IF amplifier and video detector stages of a color television receiver) supplies signals to a luminance-chrominance signal separator 12. Separator 12 (e.g., a comb filter) separates the luminance and chrominance components of the composite television signal, and supplies these separated components to respective input terminals 1 and 2 of a luminance and chrominance signal processing network 11.

The separated luminance component is processed by a luminance signal processing unit 14 in a luminance channel of the receiver, including signal amplification and peaking stages for example. The separated chrominance component is supplied to a keyed chrominance-burst separator 15, which provides separated burst information (B) and chrominance picture interval information (C). Signal separator 15 can be of the type described in U.S. Pat. No. 4,038,681 of L. A. Harwood. The separated signals are then supplied to a chrominance signal processing unit 18 for developing r-y, g-y and b-y color difference signals as known. The color difference signals from unit 18 are combined with an amplified luminance output signal (Y) from unit 14 in a signal matrix 20, for developing output r, b and g color image signals.

The luminance channel also includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in a copending U.S. patent application Ser. No. 794,128 of A. V. Tuma, et al., entitled "Brightness Control Circuit Employing A Closed Control Loop."

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, B and G, which are then coupled to respective intensity control electrodes (e.g., cathodes) of a color image reproducing kinescope 28.

Video signals from source 10 are also supplied to a sync separator 33, for separating the synchronizing (sync) signal components of the video signal. One output of separator 33 is coupled to horizontal and vertical deflection circuits 38 of the receiver. Circuits 38 supply output horizontal and vertical deflection signals to deflection coils of kinescope 28 to control horizontal and vertical image scanning of the kinescope.

A signal generator 35 develops a periodic composite ("sandcastle") keying signal in response to separated horizontal sync pulses from another output of sync separator 33, and horizontal and vertical retrace blanking signals from deflection circuits 38. A composite keying signal output from generator 35 is supplied via a terminal 6 to a signal decoder 40, which decodes the composite keying signal into keying pulses $V_B$, $V_C$, $V_K$ and $V_H$, $V_V$ as required by keyed signal processing circuits within network 11.

Keying pulses $V_B$ and $V_C$ encompass the burst interval and exhibit a mutually antiphase (push-pull) relationship, and are applied to keying inputs of a chromaburst separator 15. Keying pulse $V_K$ is in-phase with and of the same (positive) polarity as pulse $V_B$, and is applied to a keying input of comparator 30. Plural keying pulses $V_H$, $V_V$ occur during each horizontal and vertical image retrace interval, and are applied to respective plural keying inputs of output stage 22.

In the arrangements of FIG. 1, the blocks within network 11 are largely capable of being fabricated as a single integrated circuit. In such case, terminals 1–6 correspond to external connecting terminals of the integrated circuit.

Figure 3:
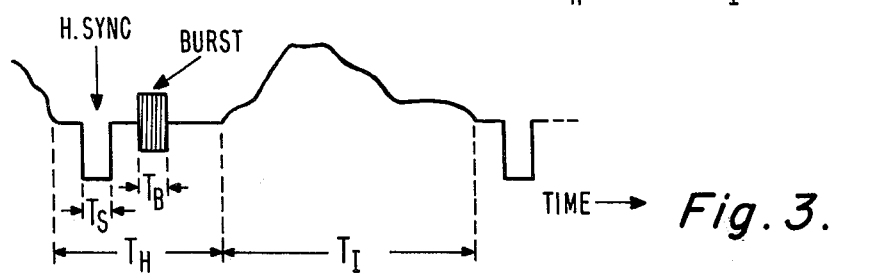
FIGS. 3–8 show signal waveforms useful in understanding the operation of the arrangements shown in FIGS. 1 and 2.
Figure 4:
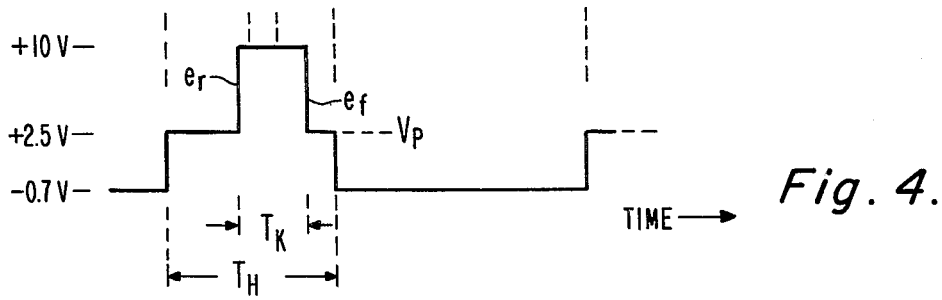

A composite horizontal keying signal produced by unit 35 is shown in FIG. 4 for one horizontal image scanning period. FIG. 3 illustrates the configuration of a typical television signal over one horizontal image scanning period, in time relationship with the keying signal of FIG. 4.

The waveform of FIG. 3 comprises a periodic picture information (trace) image interval $T_I$ (approximately 52.4 microseconds) and a periodic horizontal image blanking (retrace) interval $T_H$ (approximately 11.1 microseconds) disposed between each picture interval. The horizontal blanking interval includes a sync interval $T_S$ (approximately 4.76 microseconds) during which a horizontal sync pulse occurs, and a following burst interval $T_B$ containing the burst component (approximately 10 cycles of unmodulated signal at the chrominance subcarrier frequency of approximately 3.58 MHz according to United States television standards).

The composite horizontal keying signal as shown in FIG. 4 includes a first (lower) pulse component with a width or duration corresponding to horizontal blanking interval $T_H$, and a second (upper) pulse component disposed on a pedestal keying level $V_P$ and occurring over a time interval $T_K$. The latter time interval encompasses burst interval $T_B$. A rising edge $e_r$ of the second pulse component occurs between the end of sync interval $T_S$ and the beginning of burst interval $T_B$. A falling edge $e_f$ of the second pulse component occurs between the end of burst interval $T_B$ and the beginning of image interval $T_I$.

Figure 5:
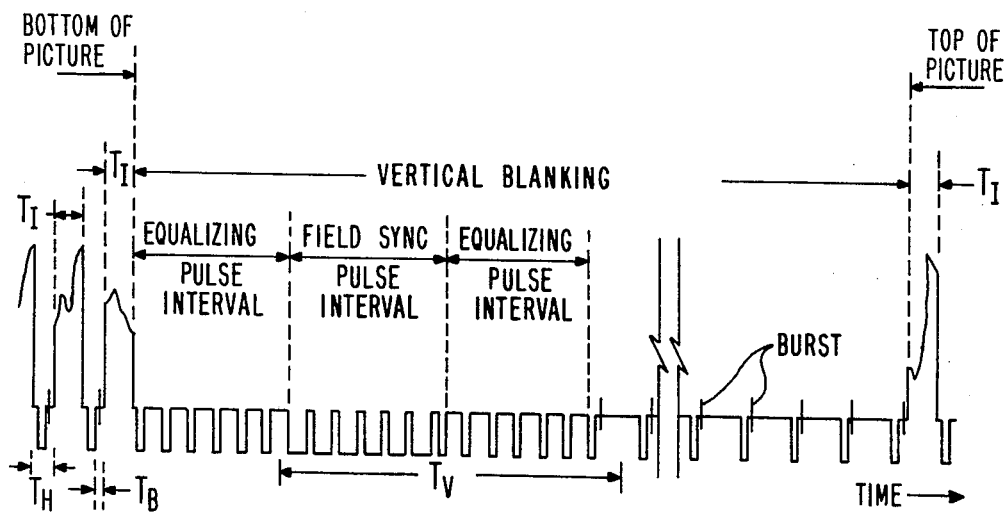
Figure 6:
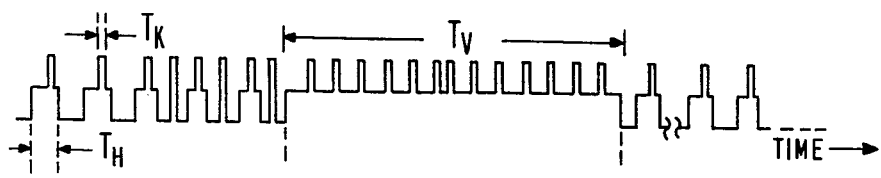
Figure 7:
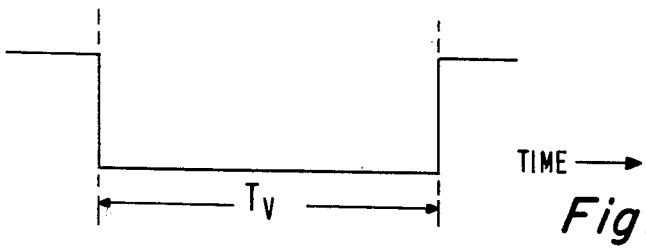
Figure 8:
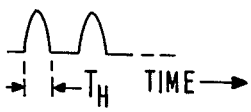

In FIG. 5, there is shown a more detailed composite video signal waveform of one or more horizontal image scanning intervals at the top and bottom of a displayed picture, separated by a vertical image blanking interval (approximately 1335 microseconds) during which picture information is absent. FIG. 6 shows a composite keying signal produced by unit 35 (FIG. 1) for both horizontal and vertical retrace blanking intervals, with respect to the video signal waveform of FIG. 5. FIG. 7 depicts one version of a vertical retrace signal of duration $T_V$ (approximately 500 microseconds) which occurs within each vertical blanking interval, as developed by deflection circuits 38 (FIG. 1). Horizontal retrace blanking (flyback) pulses as also developed by circuits 38 in FIG. 1 are shown by FIG. 8.

Figure 2:
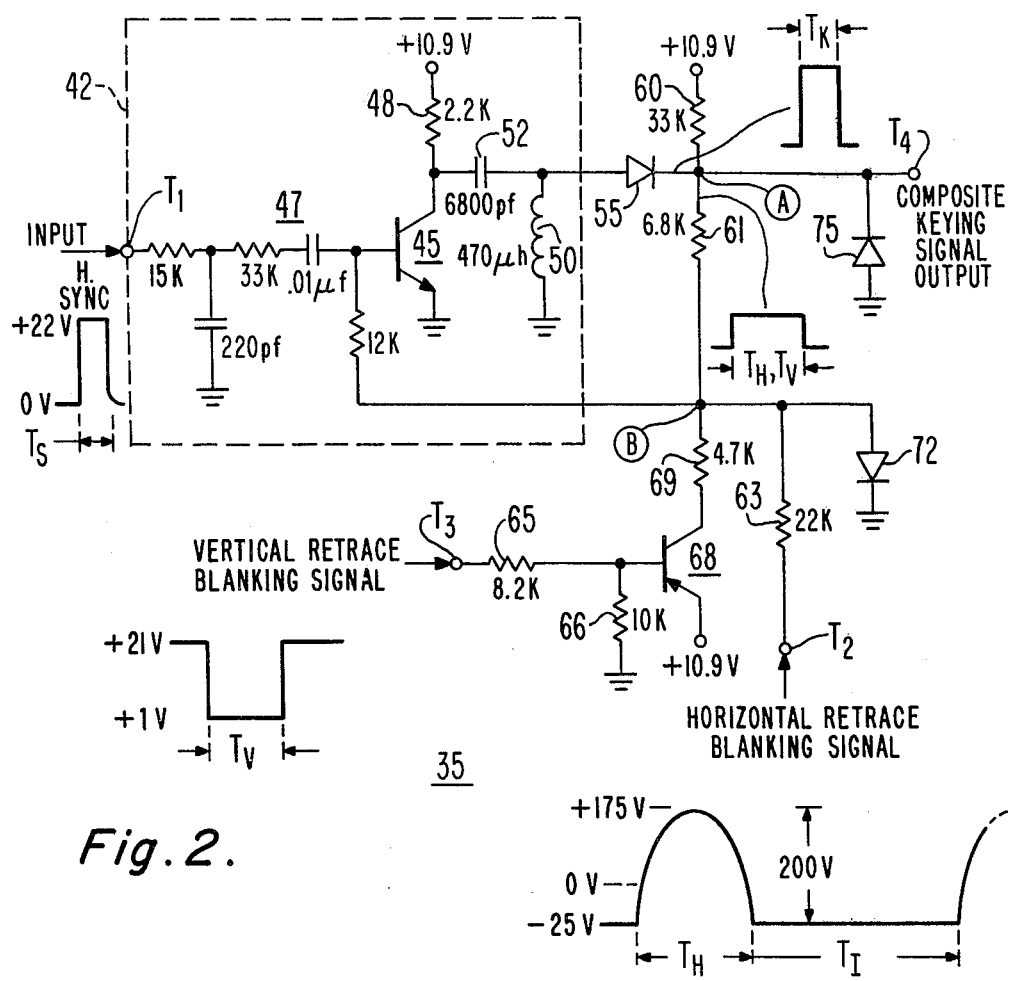
FIG. 2 illustrates circuit details of one embodiment of the keying signal generator shown in FIG. 1.

Referring now to FIG. 2, there is shown a circuit arrangement of composite keying signal generator 35.

A separated, positive horizontal sync pulse from sync separator 33 is supplied to an input terminal $T_1$ of a network 42. Network 42 comprises a burst gate pulse generator of the type disclosed in U.S. Pat. No. 4,051,518 of G. K. Sendelweck. Network 42 includes a normally nonconductive common emitter switching transistor 45 with an associated input signal translating circuit 47, and an output load circuit including a collector load impedance 48 and a resonant circuit comprising an inductor 50 and a capacitor 52.

The resonant circuit is excited into ringing at its natural frequency when transistor 45 conducts in response to the leading edge of the positive horizontal sync pulse, as applied to a base of transistor 45 via translating network 47. The period of the ringing signal is determined by the values of inductor 50 and capacitor 52. A resulting output ringing signal in the collector circuit of transistor 45 coacts with the inverse conduction characteristics of transistor 45 to turn off transistor 45 prior to the completion of one full cycle of ringing, to inhibit amplitude excursions of the ringing signal beyond the first full cycle so that a positive output voltage pulse produced at the junction of capacitor 52 and inductor 50 corresponds to the first full half cycle (of positive polarity) of the ringing signal. The positive output pulse occurs over interval $T_K$ with horizontal interval $T_H$, and encompasses the burst interval.

Transistor 45 also can be switched in response to a horizontal flyback pulse instead of a horizontal sync pulse as shown. The timing of the output burst gate pulse may be adjusted (i.e., delayed) relative to the burst interval by varying the value of either or both of capacitor 52 and inductor 50 to adjust the period of ringing of resonant circuit 50, 52. Also, the time at which resonant circuit 50, 52 is excited into ringing and hence the timing of the output pulse can be tailored by employing various input circuit configurations to delay the time at which transistor 45 initially conducts in response to the applied input pulse. Additional details of circuit 42 are found in the aforementioned patent of G. K. Sendelweck.

The positive output pulse from circuit 42 is coupled via a diode 55 to a circuit point A. Circuit point A is included in a voltage divider network including resistors 60 and 61 arranged in series between a positive D.C. voltage supply (+10 10.9 volts) and a circuit point B. Circuit point B establishes a reference potential for the voltage divider, and thereby a desired potential at point A during each blanking interval, as follows.

During each horizontal blanking interval $T_H$, positive horizontal retrace flyback pulses are coupled via an input terminal $T_2$ and a resistor 63 to point B. Similarly, during each vertical retrace blanking interval $T_V$, negative-going vertical blanking pulses are coupled to point B via a voltage divider including resistors 65 and 66, a transistor 68, and a resistor 69. Also coupled to point B is a diode 72 poled for forward current conduction from point B to ground.

Circuit point B is clamped to the substantially fixed offset voltage of diode 72 (+0.7 volts) when diode 72 is rendered conductive during interval $T_H$ in response to the positive horizontal blanking pulses, thereby establishing a corresponding reference voltage for voltage divider 60, 61 at point B. At the same time, a voltage of approximately +2.5 volts is developed at point A. This level occurs over interval $T_H$ and corresponds to the desired level ($V_P$ in FIG. 4) for the first (lower) pulse component of the composite keying signal. The composite horizontal keying signal is developed at point A and comprises the burst gate pulse output from circuit 42 superimposed on the pulse component produced by the action of diode 72 and voltage divider 60, 61. The composite signal (FIG. 4) is coupled from point A via an output terminal $T_4$ to decoder 40 (FIG. 1).

Analogous observations pertain with respect to generating a composite vertical keying signal during vertical blanking interval $T_V$. In this case, the vertical blanking signal applied to terminal $T_3$ causes PNP transistor 68 to conduct over interval $T_V$. Diode 72 is rendered conductive to establish a +0.7 volt reference potential at point B, and a voltage then developed at point A corresponds to the desired pedestal level $V_P$ (approximately +2.5 volts) of the lower pulse component for vertical blanking purposes. A composite keying signal waveform produced for vertical blanking purposes is shown in FIG. 6.

It is noted that a diode 75 is connected between the output of circuit 35 (point A, terminal $T_4$) and a point of ground reference potential. Diode 75 is non-conductive at all times except during the picture information interval ($T_I$ in FIG. 3), at which time it is forward biased to conduct in response to the horizontal signal applied to terminal $T_2$ of circuit 35.

More specifically, the horizontal signal exhibits a negative voltage level (e.g., −25 volts) during image intervals $T_I$ between horizontal blanking intervals $T_H$. This negative level reverse biases diode 72 rendering it non-conductive and, after being coupled via resistor 61 to point A, is sufficient to forward bias diode 75. At this time, current flows from diode 75, through resistors 61 and 63, to terminal $T_2$. A voltage then appearing at output terminal $T_4$ corresponds to the substantially fixed offset voltage of conductive diode 75 (i.e., the voltage level at terminal $T_4$ is clamped to −0.7 volts).

With the output of circuit 35 clamped by diode 75 as described, any improperly timed keying signals generated by circuit 35 in response to spurious signals, such as noise associated with the horizontal sync signal input to circuit 42, will not be coupled to succeeding keyed circuits. A similar result occurs in a system wherein the burst gate pulse circuit (e.g., circuit 42 or an equivalent circuit) responds to a horizontal flyback pulse instead of a horizontal sync pulse as shown. A horizontal flyback pulse may contain a "ripple" component of sufficient amplitude to improperly trigger a burst gate "ringer" circuit of the type shown in FIG. 2. Also in this case, the described clamping arrangement serves to suppress a keying signal improperly timed to occur during the picture interval.

Figure 9:
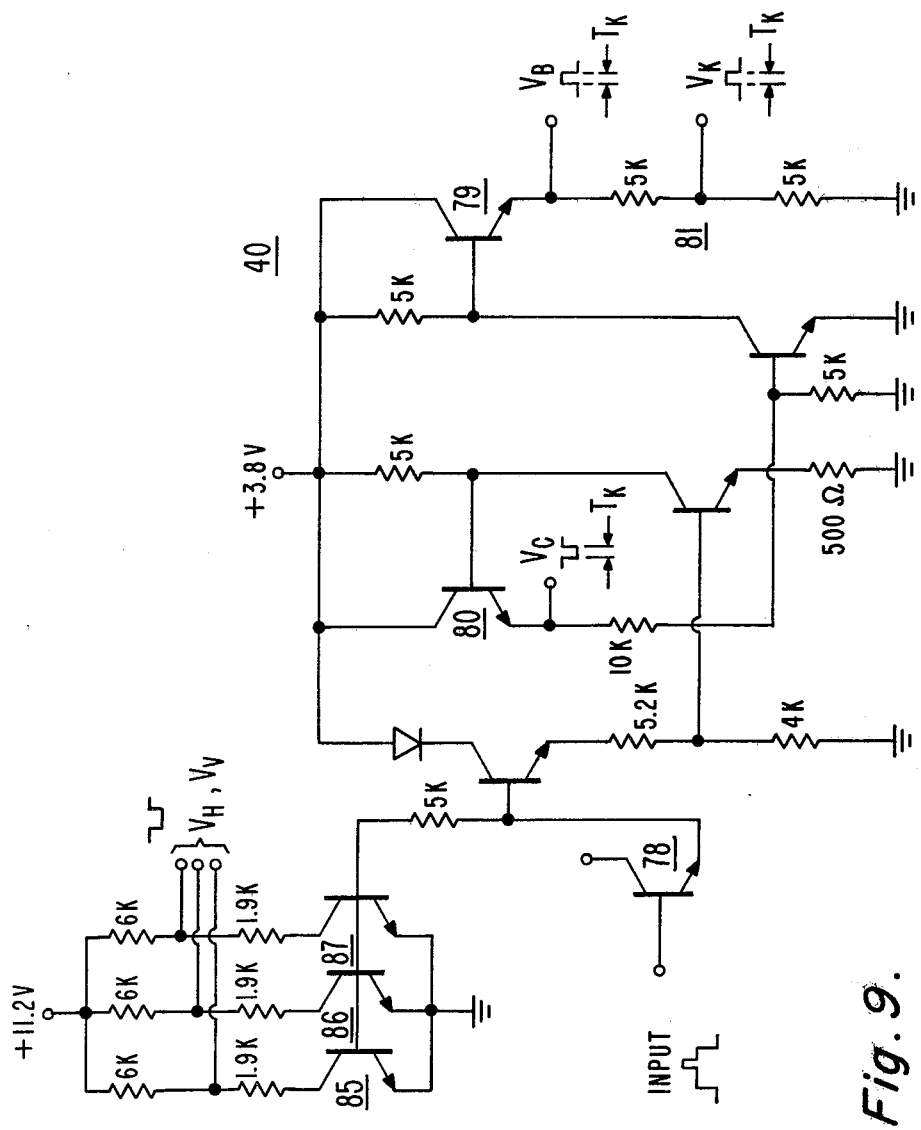
FIG. 9 shows circuit details of a signal decoder circuit for decoding signals produced by the keying signal generator shown in FIGS. 1 and 2.

FIG. 9 illustrates a circuit arrangement of decoder 40 (FIG. 1), for decoding the composite keying signal output from generator 35 into appropriate separate keying pulses.

The composite keying signal from circuit 35 is applied to a transistor 78. Complementary phase keying signals $V_B$ and $V_C$ for use by burst separator 15 (FIG. 1) appear at emitter outputs of transistors 79 and 80, respectively. Comparator keying signal $V_K$ is derived from a point in a voltage divider 81 in the emitter circuit of transistor 79. Plural horizontal and vertical blanking pulses $V_H$, $V_V$ are derived from respective voltage divider networks in collector output circuits of transistors 85, 86 and 87.

Figure 10:
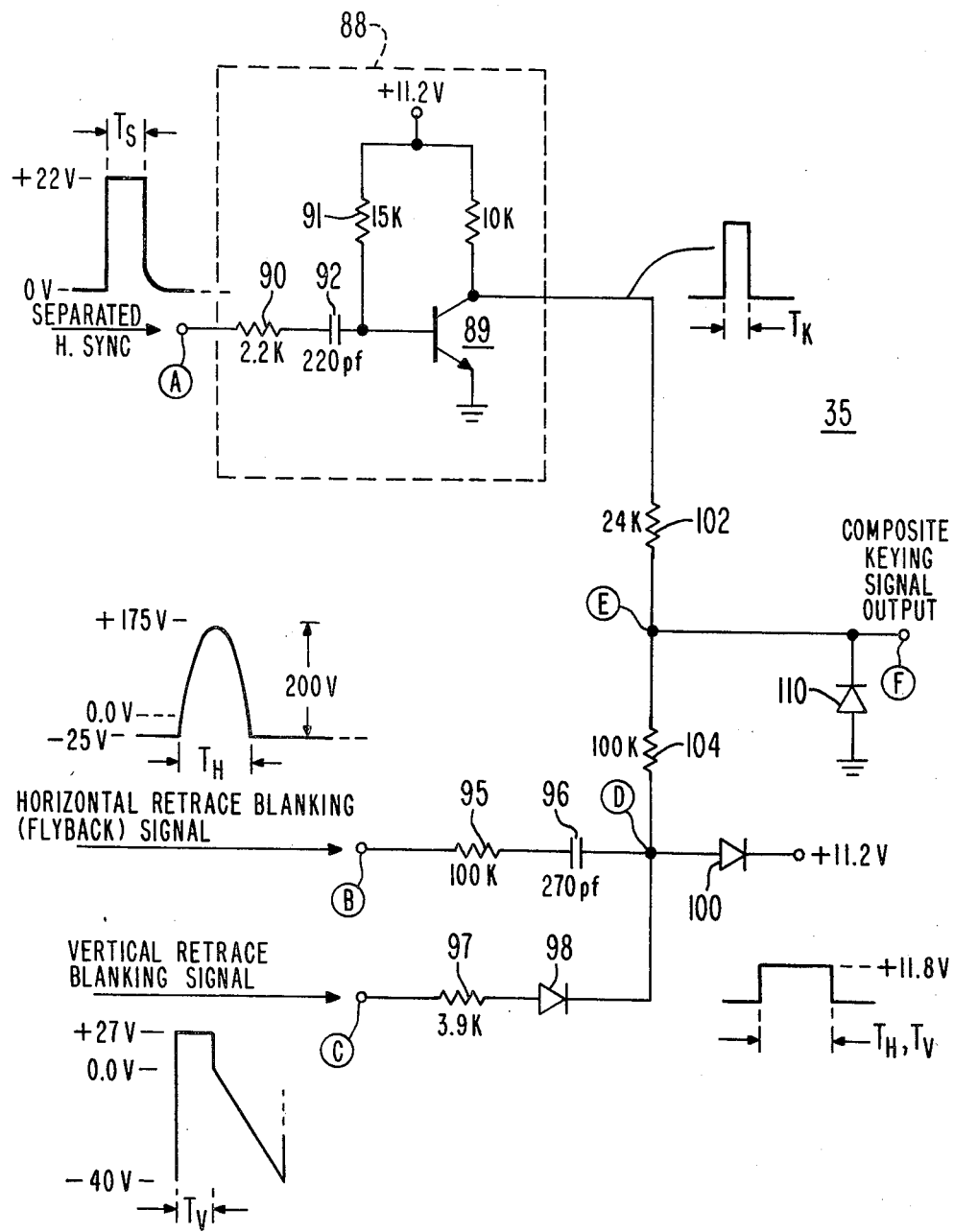
FIG. 10 depicts an alternative circuit embodiment of the keying signal generator shown in FIG. 1.

Referring now to FIG. 10, there is shown an alternative circuit arrangement of composite keying signal generator 35. This arrangement is described in large part in copending, concurrently filed U.S. patent application of R. L. Shanley, II, entitled "Composite Keying Signal Generator For A Television Receiver."

A separated, positive horizontal sync pulse from sync separator 33 (FIG. 1) is applied to an input terminal A of a network 88. Network 88 comprises a burst gate pulse generator of the type disclosed in U.S. Pat. No. 4,173,023 of W. A. Lagoni, et al. Network 88 is arranged as a monostable multivibrator (i.e., a "one-shot" multivibrator) and includes a common emitter transistor 89.

Under quiescent conditions (i.e., before the sync pulse appears), transistor 89 is biased to conduct heavily in a saturated state. At this time, the collector output potential of transistor 89 closely approaches the emitter potential (i.e., ground potential). The positive-going rising amplitude edge of the sync pulse, as coupled to transistor 89 via an input differentiator network 90, 91, 92 is in a direction to cause transistor 89 to conduct. However, since transistor 89 is saturated at this time, the positive-going amplitude portion of the sync pulse has substantially no effect on the conduction of transistor 89.

A negative-going falling amplitude edge transition of the sync pulse as derived from the input differentiator network causes transistor 89 to come out of saturation for a time primarily determined by a time constant established by resistors 90, 91 and capacitor 92. Transistor 89 turns off in response to this negative transition, causing the collector output voltage to rise quickly in a positive direction after the sync interval ends.

The collector voltage of transistor 89 remains at a positive level until a later time, when transistor 89 returns to the saturated state. The saturated state is again reached when capacitor 92 charges to a positive level, via resistors 90 and 91, sufficient to forward bias the base-emitter junction of transistor 89. Transistor 89 then conducts heavily, whereby the collector output voltage then rapidly decreases to the quiescent level of approximately ground potential.

A resulting burst gate pulse produced at the collector of transistor 89 corresponds to an appropriately delayed sync pulse which encompasses the burst interval. In particular, it is noted that the burst gate pulse from transistor 89 is accurately timed to begin after the horizontal sync pulse interval and to end before the image interval, due to the manner in which transistor 89 operates between well-defined saturated and cut-off states in response to the rising and falling edges of the sync pulse. Additional details concerning the operation of network 88 are found in the aforementioned U.S. patent of W. A. Lagoni, et al.

Horizontal retrace blanking (flyback) signals are applied to an input terminal B and are coupled to a circuit point D via a resistor 95 and a capacitor 96. Vertical retrace blanking signals are applied to an input terminal C and are coupled to circuit point D via a resistor 97 and a diode 98. In this example, the configuration of the vertical retrace blanking waveform differs somewhat from the corresponding waveform illustrated in connection with the circuit of FIG. 2. A signal clipping network comprising a diode 100 coupled between point D and a source of D.C. voltage (+11.2 volts) serves to clip positive amplitude excursions of the horizontal and vertical blanking signals to a fixed positive level (+11.8 volts) at point D.

A voltage divider network comprising resistors 102 and 104 is coupled between circuit point D and a reference potential. In this example, the reference potential is derived from the collector potential of transistor 89 when transistor 89 exhibits a saturated conductive state. At this time, the collector potential of transistor 89 closely approaches the emitter potential of transistor 89, or ground reference potential. Reference is made to the composite keying signal waveform of FIG. 4 in connection with the following discussion.

Pedestal level $V_P$ (+2.5 volts) is formed in response to the horizontal blanking signal applied to terminal B. This signal is clipped by the network comprising diode 100 to form a pulse having a positive peak level of 30 11.8 volts at point D. At this time, transistor 89 is saturated, whereby the collector of transistor 89 closely approaches ground potential and provides a reference potential for voltage divider 102, 104. The voltage divider translates the clipped signal to produce a positive peak pulse level $V_P$ of +2.5 volts at point E. The second, upper pulse component of the composite keying signal, which occurs during intermediate interval $T_K$, corresponds to the burst gate output pulse from transistor 89 as discussed. This pulse component is coupled to combining point E via resistor 102. The composite keying signal developed at point E also appears at a circuit output terminal F.

Although the operation of the circuit in FIG. 10 has been described with regard to a composite keying signal developed during the horizontal blanking interval (FIGS. 4 and 6), the circuit operates in similar fashion to produce a composite keying signal during vertical retrace blanking intervals (FIG. 6).

It is noted that the described arrangement utilizes a common clipping network (comprising diode 100) and a common voltage divider network (comprising resistor 102, 104) for the purpose of providing pedestal keying level $V_P$ in response to the horizontal and vertical retrace blanking signals. The use of single, common clipping and voltage divider signal translating networks in this fashion enhances the reliability of pedestal keying level $V_P$ by reducing to a minimum the amount of signal translating components required to establish the desired level of keying pedestal $V_P$. This results in a cost effective circuit which reduces the effects of circuit tolerance variations and temperature effects to an acceptable minimum. Also advantageous is the manner in which transistor 89 is utilized to provide a reference potential for voltage divider 102, 104 during the blanking intervals as discussed. These and other advantages of the circuit of FIG. 10 as so far described are discussed in the aforementioned copending patent application of R. L. Shanley, II.

It is noted that the circuit of FIG. 10 also includes a diode 110 connected between the output of circuit 35 (point E, terminal F) and a point of ground reference potential. Diode 110 corresponds functionally to diode 75 of FIG. 2.

Diode 110 is non-conductive at all times except during picture information interval $T_I$, at which time it conducts in response to the negative level component of the horizontal rate signal applied to terminal B. The conduction of diode 110 via resistors 104, 95 and capacitor 96 clamps output terminal F to the fixed offset voltage of diode 110 (−0.7 volts). Accordingly, unwanted keying signals generated during picture intervals are prevented from being coupled to succeeding keyed circuits.

What is claimed is:

1. In a color television reciever for processing a composite color television signal containing image information occurring during periodic image intervals and synchronizing information occurring during periodic image blanking intervals, said synchronizing information including: a vertical synchronizing component occurring during vertical blanking intervals, a horizontal synchronizing component occurring during horizontal blanking intervals, and a color burst component occurring during a burst interval within horizontal blanking intervals; said receiver including means for providing a horizontal reference pulse representative of said horizontal synchronizing component; means for deriving horizontal and vertical blanking signals from said synchronizing information; keyed signal processing circuits; and apparatus including means for generating at an output a composite keying signal comprising a first pulse substantially coincident with said blanking intervals and a second pulse superimposed on said first pulse and encompassing said burst interval, said apparatus comprising:

translating means responsive to said horizontal and vertical blanking signals for producing said first pulse;

keyed means responsive to said horizontal reference pulse for producing a pulse encompassing said burst interval and corresponding to said second pulse;

means for combining said first and second pulses to produce said composite keying signal at said output of said composite keying signal generator means;

means for coupling said composite keying signal to said keyed signal processing circuits; and control means coupled to said composite keying signal generator means, said control means exhibiting one conductive condition during blanking intervals of said television signal, and exhibiting another conductive condition during image intervals for inhibiting the output of said composite keying signal generator means during said image intervals.

2. Apparatus according to claim 1, wherein: said horizontal blanking signal exhibits a first level during horizontal blanking intervals and a second level during horizontal imge intervals; and
said control means exhibits said other conductive condition in response to said second level of said horizontal blanking signal.

3. Apparatus according to claim 1, wherein: said composite keying signal developed at said output comprises plural keying levels during horizontal blanking intervals and a reference level during horizontal image intervals; and
said control means exhibits said other conductive condition in response to said reference level during horizontal image intervals.

4. Apparatus according to claim 3, wherein: said control means is coupled between said output and a point of reference potential.

5. Apparatus according to claim 4, wherein:
said control means comprises a semiconductor PN junction device responsive to said reference level for clamping said output to a given level during imge intervals.

6. Apparatus according to claim 1, wherein said keyed means comprises:
input means for providing a pulse representative of said horizontal reference pulse;
transistor switch means having an inverse current conduction characteristic and an input electrode coupled to said input means, an output electrode coupled to a source of operating potential, and a common electrode, said output and common electrodes defining a main current conduction path therebetween; and
resonant circuit means comprising at least an inductance and a first capacitance, coupled across said main current conduction path of said transistor switch means, said resonant circuit means being excited into ringing when said transistor switch means conducts in response to said pulse to produce a ringing waveform with a period determined by the vaues of said inductance and first capacitance and with a duration determined by current conduction of said transistor, wherein said resonant circuit means coacts with said inverse conduction characteristic of said transistor to render said transistor non-conductive prior to exceeding a first full cycle of said waveform, to inhibit amplitude excursions of said waveform beyond said first full cycle and to provide said waveform with an output pulse corresponding to a first full half cycle of one polarity of said waveform and encompassing said burst interval.

7. In a color television receiver for processing a composite color television signal containing image information occurring during periodic image intervals and synchronizing information occurring during periodic image blanking intervals, said synchronizing information including: a vertical synchronizing component occurring during vertical blanking intervals, a horizontal synchronizing component occurring during horizontal blanking intervals, and a color burst component occurring during a burst interval within horizontal blanking intervals; said receiver including means for providing a horizontal reference pulse representative of said horizontal synchronizing component; means for deriving horizontal and vertical blanking signals from said synchronizing information; keyed signal processing circuits; and apparatus including means for generating at an output a composite keying signal comprising a first pulse substantially coincident with said blanking intervals and a second pulse superimposed on said first pulse and encompassing said burst interval, and said apparatus comprising:
means for coupling said derived horizontal and vertical blanking signals to a common point;
means, operative in common with respect to said derived horizontal and vertical blanking signals coupled to said common point for clipping amplitude excursions of said derived horizontal and vertical blanking signals to a given level;
means, operative in common with respect to said clipped horizontal and vertical blanking signals, for translating said clipped horizontal and vertical blanking signals to produce horizontal and vertical blanking signals of a desired magnitude corresponding to said first pulse;
keyed means responsive to said horizontal reference pulse for producing a pulse encompassing said burst interval and corresponding to said second pulse;
means for combining signals from said keyed means and from said translating means to produce said composite keying signal at said output of said composite keying signal generator means;
means for coupling said composite keying signal to said keyed signal processing circuits; and
control means coupled to said composite keying signal generator means, said control means exhibiting one conductive condition during blanking intervals of said television signal, and exhibiting another conductive condition during image intervals for inhibiting the output of said composite keying signal generator means during said image intervals.

8. Apparatus according to claim 7, wherein said keyed means comprises:
an active device with an input for receiving said horizontal reference pulse, and an output from which said second pulse is provided; and
means for biasing said active device to exhibit one conductive state under quiescent conditions, and another conductive state in response to an edge transition of said horizontal reference pulse occurring at the end of the horizontal reference pulse interval.

9. Apparatus according to claim 8, wherein:
said active device comprises a transistor having an input electrode, an output electrode, and a common electrode coupled to a reference potential, said output and common electrodes defining a main current conduction path of said transistor; and
said transistor is biased to exhibit a saturated conductive state under quiescent conditions, whereby the potential at said output electrode of said transistor closely approaches the potential at said common electrode and thereby closely approaches said reference potential.

10. Apparatus according to claim 9, wherein:
said translating means comprises a voltage divider network coupled between said common point and said output electrode of said transistor, whereby said voltage divider is coupled between said common point and said reference potential via said main current conduction path of said transistor when said transistor operates under quiescent conditions, to thereby establish a desired level for said clipped signals corresponding to a desired level of said first pulse of said composite keying signal.

* * * * *